Dec. 28, 1943.        J. W. EDGEMOND                2,338,030
                     AIRCRAFT CONSTRUCTION
                      Filed April 9, 1942          5 Sheets-Sheet 1
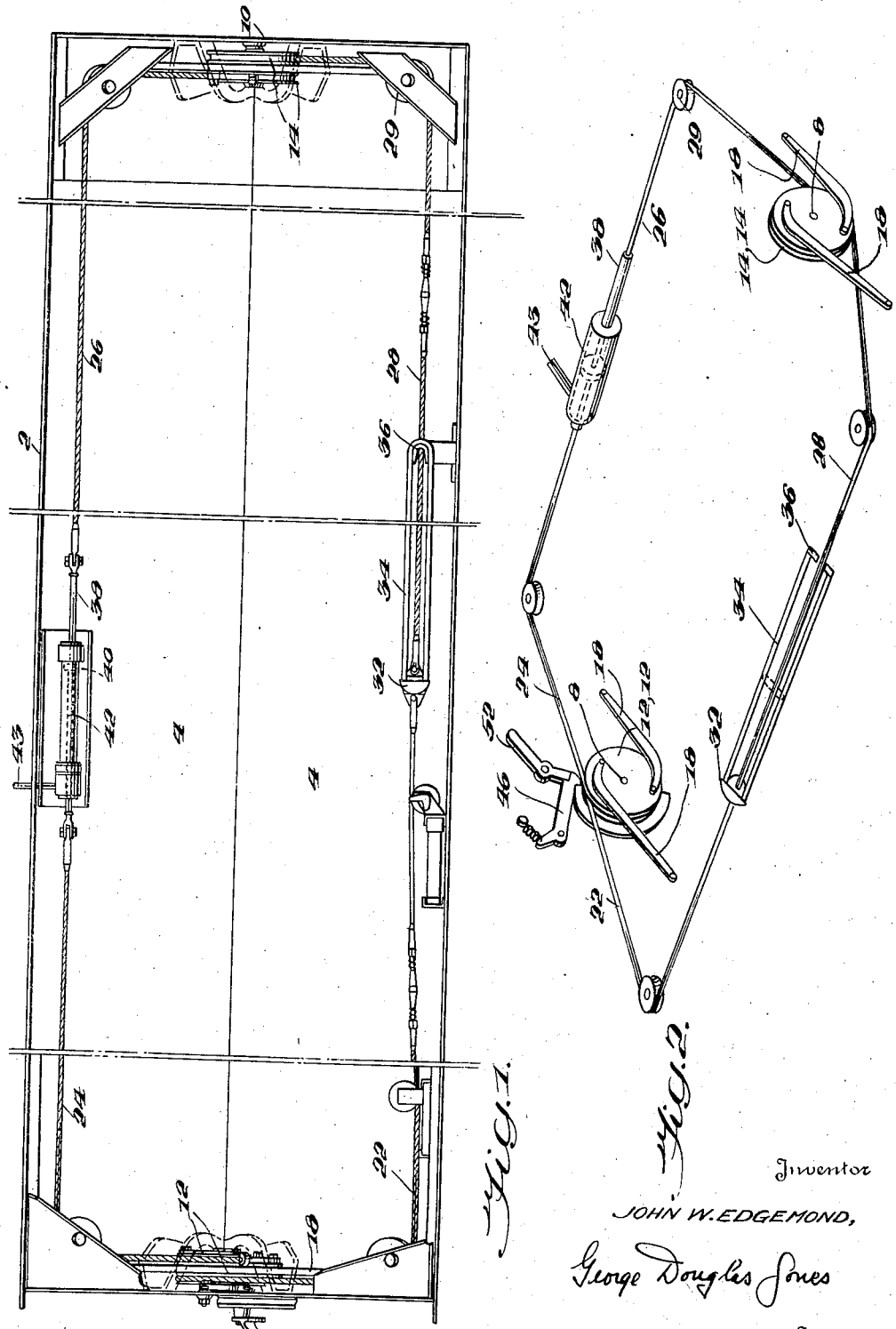
Inventor
JOHN W. EDGEMOND,
George Douglas Jones
            Attorney

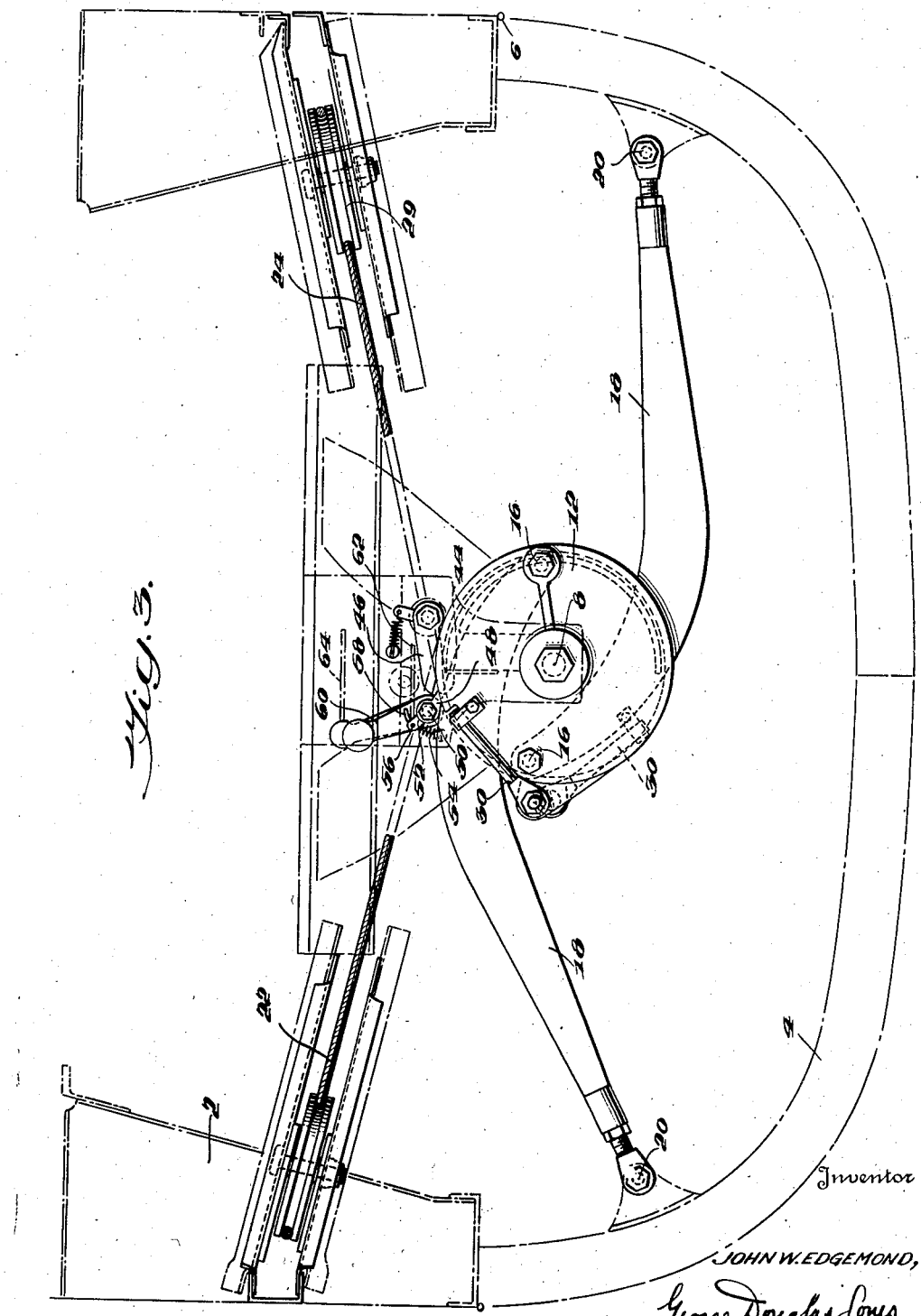

Dec. 28, 1943.  J. W. EDGEMOND  2,338,030
AIRCRAFT CONSTRUCTION
Filed April 9, 1942  5 Sheets-Sheet 3
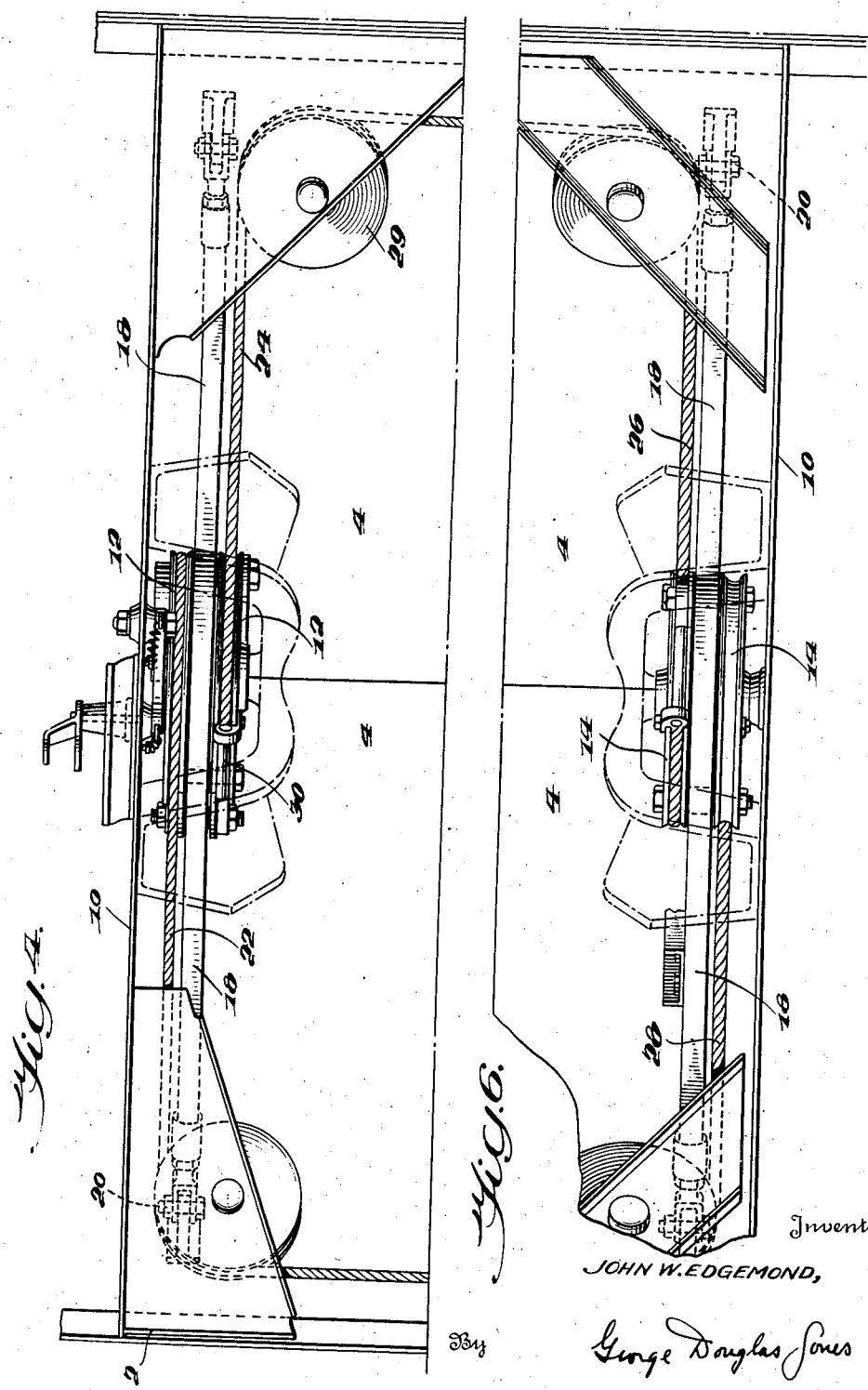
Inventor
JOHN W. EDGEMOND,
By George Douglas Jones
Attorney

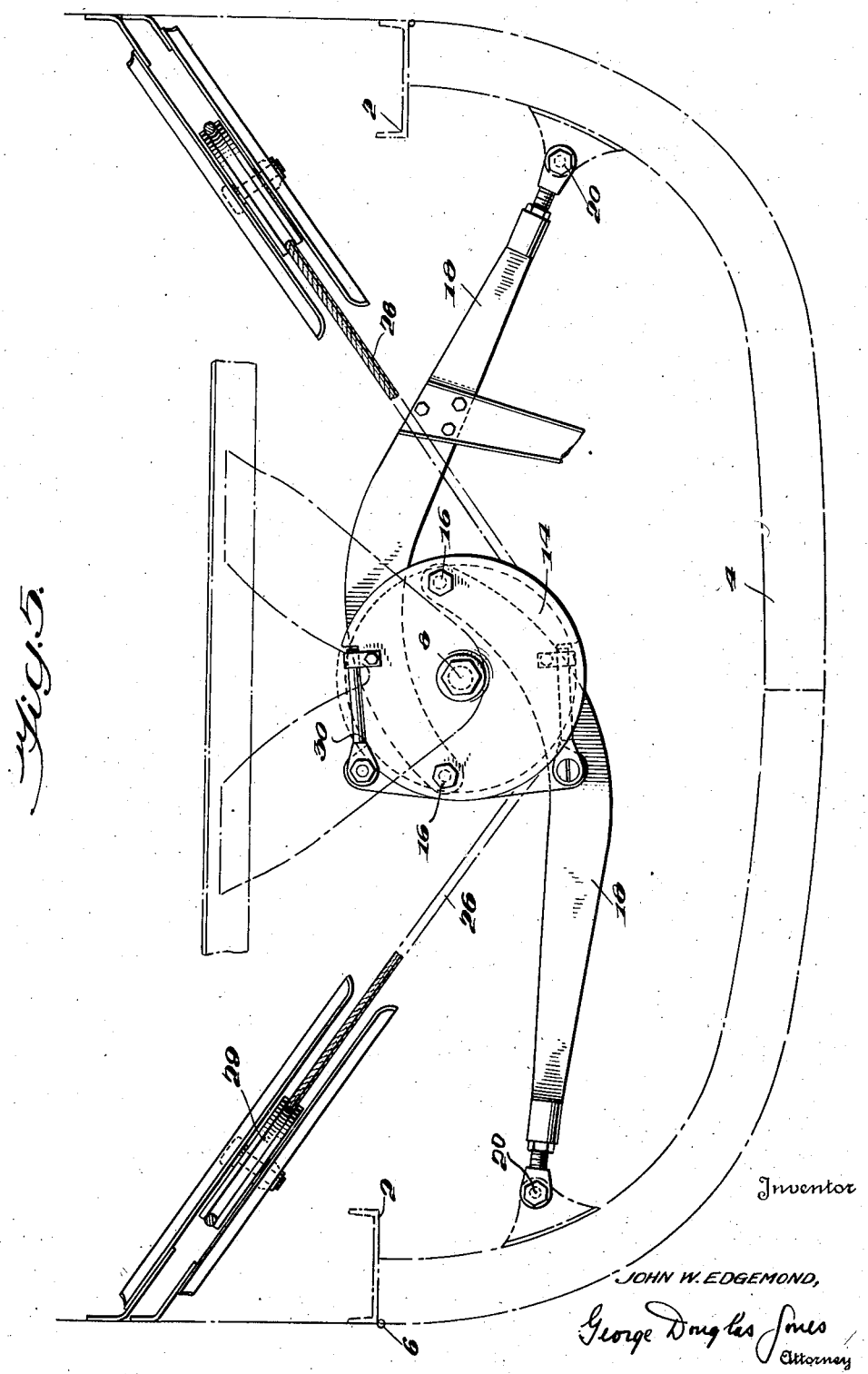

Dec. 28, 1943.   J. W. EDGEMOND   2,338,030
AIRCRAFT CONSTRUCTION
Filed April 9, 1942     5 Sheets-Sheet 5
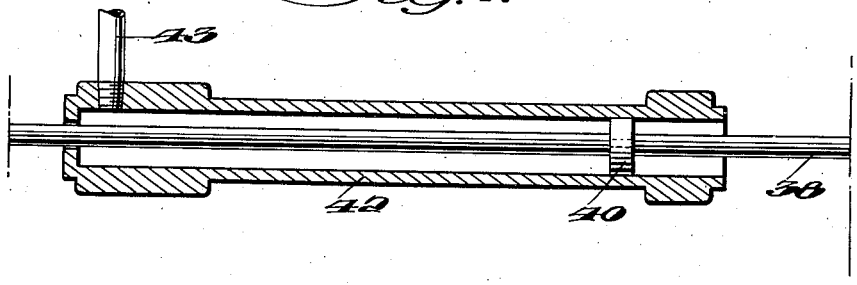
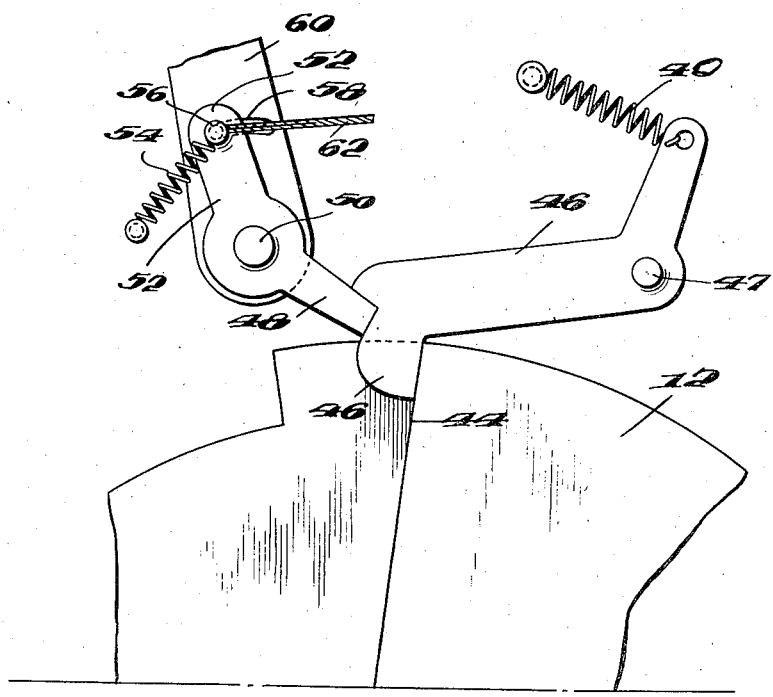
Inventor
JOHN W. EDGEMOND,
By George Douglas Jones
Attorney Patented Dec. 28, 1943

2,338,030

UNITED STATES PATENT OFFICE 2,338,030

AIRCRAFT CONSTRUCTION

John W. Edgemond, Richmond Heights, Mo., assignor to The Glenn L. Martin Company, Middle River, Md., a corporation of Maryland Application April 9, 1942, Serial No. 438,217

8 Claims. (Cl. 89—1.5)

This invention relates to bomb bays and especially to door operating mechanism therefor.

When bombs are to be dropped from an aircraft, it is important that the bomb bay doors be opened as quickly as possible. The primary object of the present invention is to provide a mechanism for rapidly opening bomb bay doors, with means for restoring them to closed position.

A further object of the invention is to provide, in connection with bomb bay doors, means constantly urging the doors to open position, with a latch for holding them in closed position so that when the latch is released the doors are quickly and automatically opened.

Still another object of the invention is to provide a tensioned resilient spring or other similar device for acting on the doors to open them immediately upon the release of the latching mechanism.

An additional object is to provide a device for restoring the doors to closed position, this mechanism likewise restoring the spring to its tensioned condition.

Another object of the invention is to locate operating mechanism of this nature which is located around the sides and at the ends of a bomb bay, for operating simultaneously the two doors thereof from both ends simultaneously through a single source of power. More especially, the invention contemplates the use of a continuous cable mechanism operating to achieve this result.

Further objects and advantages of the invention will appear more fully from the following description, particularly when taken in conjunction with the accompanying drawings which form a part thereof.

In the drawings:

Fig. 1 is a top plan view of a bomb bay embodying the invention;

Fig. 2 is a schematic view of the door operating mechanism;

Figs. 3 and 4 are an end view and a top plan view, respectively, on an enlarged scale, of the mechanism at the left-hand end of Fig. 1;

Figs. 5 and 6 are similar views, respectively, of the mechanism at the right-hand end of Fig. 1;

Fig. 7 is a cross section through the power cylinder; and

Fig. 8 is a detail view of the latch mechanism.

The invention is utilized, for example, in connection with a bomb bay having a frame 2 which is closed below by two doors 4 hinged at 6 on the frame.

Mounted on shafts 8 on the left and right end walls 10 of the bomb bay are spaced discs or pulleys 12, 12 and 14, 14, respectively (see Figs. 3, 4 and 5, 6, respectively). Pivoted at 16 between each pair of discs at eccentric points are arms or links 18 which are pivoted at 20 to the doors 4. These links, as shown in Figs. 3 and 5, extend past the shafts 8, so that upon turning the discs (counterclockwise in Fig. 3, clockwise in Fig. 5) the bomb bay doors will be swung to open position.

To each of the pulleys 12 and 14 are connected oppositely directed cables formed of portions 22, 28 and 24, 26, respectively, the ends of these cables running partly around and being connected to the pulleys by cable ends 30. The cables are so arranged that when tension is exerted on cable portions 22, 26 the discs turn in a direction to open the doors, while tension on cable portions 24, 28 tends to close the doors. Cable portions 22, 28 extend over pulleys 29 and along one side of the bomb bay, and their ends are connected to the movable end piece 32 of a resiliently extensible member 34, which may be constituted by a number of parallel elastic bands. The other end 36 of member 34 is fixed to the frame of the bomb bay.

Cable portions 24, 26 run over pulleys 29 and are connected to opposite ends of a piston rod 38, the piston 40 of which is slidable in a hydraulic cylinder 42 supplied by a pipe 43 (see Fig. 7).

The doors are normally held in closed position by the mechanism shown in Figs. 3 and 8. Disc 12 has a catch surface 44 engageable by a hook 46 pivoted at 47, the surfaces being not quite radial to the axis of shaft 8 so that hook 46 does not positively lock the disc. Hook 46 is held in locking position by a dog 48 which normally engages a notch in the hook, and is urged to such position by a spring. Dog 48 is pivoted on a stem 50, and has a lever arm 52. Spring 54 connected to arm 52 tends to hold the dog in locking position. A pin 56 in arm 52 engages in a slot 58 in lever 60 likewise pivoted on shaft 50. Cables 62 and 64 are connected to arm 52 and lever 60, respectively, these cables being connected to the normal control and to an emergency control, respectively.

The device operates in the following manner:

When the parts are in the position shown in the drawings, the bomb bay doors are closed, being so held by catch 46 against the action of the stretched elastic member 34.

When either of cables 62 or 64 is pulled, dog 48 is removed from the path of catch 46, and surface 44, under the action of spring 34, will push the catch out of the way. Spring 34 will exert a pull on cable 32 to turn discs 12 clockwise, Fig. 2. This turning winds cable 24 onto the disc, and through piston rod 38 and cable 26 turns disc 14 also clockwise, Fig. 2. Thus the single power storing elastic means 34 exerts a force at both ends of the bomb bay doors tending to open them.

When the desired number of bombs has been dropped, fluid under pressure is admitted by pipe 43 to cylinder 42 and moves cable 24 to the right, Fig. 2. This turns disc 12 and, through cables 22, 28, by stretching elastic 34, likewise turns disc 14 clockwise to close the doors. When the doors are closed, the catch 46 and dog 48 are automatically restored to locking position.

An important feature of the invention is that the operation of the device is largely independent of rigging loads and temperature variations of the cable which, in any other type of construction, might allow the bomb bay doors to remain partly open because of changes in length of the cable resulting from temperature or similar variations. Since the pivots of arms 18 on the discs move an appreciable distance before any substantial lateral displacement of the arms takes place, small variations in cable length do not produce proportionally great movements of the arms and the bomb bay door connected thereto.

It is apparent also that the invention offers a very high mechanical advantage at the beginning and end of the door opening cycle. Obviously, any number of door pushrods can be synchronized in the manner shown, for doors that are too long to operate from two points.

While I have described herein one embodiment of my invention, I wish it to be understood that I do not intend to limit myself thereby, except within the scope of the appended claims.

I claim as my invention:

1. In a bomb bay having a door extending longitudinally thereof and means hinging said door on the bay, a member rotatably mounted at each end of the bomb bay, means connecting each of said members to the door whereby rotation of the member moves the door, cable means wound on each of said members in a direction to turn the members to open the door when a force is exerted on the cable means in a first direction and to turn the members to close the door when a force is exerted on the cable means in a second direction, energy storing means connected to said cable means to exert a force in such first direction, power means to exert a force on said cable means in said second direction, and releasable means for holding the said members in a position corresponding to closing of the door against the action of said energy storing means.

2. In a bomb bay having a door extending longitudinally thereof and means hinging said door on the bay, a member rotatably mounted at each end of the bomb bay, means connecting each of said members to the door whereby rotation of the members moves the door, cable means wound on each of said members in a direction to turn the members to open the door when a force is exerted on the cable means in a first direction and to turn the members to close the door when a force is exerted on the cable means in a second direction, said cable means extending along opposite sides of the bomb bay, energy storing means connected to said cable means to exert a force in such first direction, and power means to exert a force on said cable means in said second direction.

3. In a bomb bay having a door extending longitudinally thereof and means hinging said door on the bay, a member rotatably mounted at each end of the bomb bay, means connecting each of said members to the door whereby rotation of the members moves the door, cable means wound on each of said members in a direction to turn the members to open the door when a force is exerted on the cable means in a first direction and to turn the members to close the door when a force is exerted on the cable means in a second direction, said cable means extending along opposite sides of the bomb bay, energy storing means located on one side of the bomb bay connected to the cable means on such side to exert a force on the cable means in such first direction, and power means located on the other side of the bomb bay and connected to the cable means on such other side to exert a force on the cable means in said second direction.

4. In a bomb bay having a door extending longitudinally thereof and means hinging said door on the bay, a member rotatably mounted at each end of the bomb bay, means connecting each of said members to the door whereby rotation of the members moves the door, two cables each wound on each of said members and extending along the opposite sides of the bomb bay, including a first cable portion connected to one of said members and extending along one side of the bay and a second cable portion connected to the other member and extending along the other side of the bomb bay, said portions being wound on each of said members in a direction to turn the members to open the door when a force is exerted on the cable portions and energy storing elastic means connected to one of said cables to exert such force on that cable and through one of the members on the other cable.

5. In a bomb bay having a door extending longitudinally thereof and means hinging said door on the bay, a member rotatably mounted at each end of the bomb bay, means connecting each of said members to the door whereby rotation of the members moves the door, two cables each wound on each of said members and extending along the opposite sides of the bomb bay, a stretchable resilient member on one side of the bomb bay connected to the cable on the same side, a power device on the other side of the bay connected to the cable on such other side, said cables being so wound on said drums that resumption by said resilient member of its normal condition exerts a force on the cable on the same side in a direction to turn one of the members in a direction to open the door and through such member exerts a force on the other cable to turn the other member in a direction to open the door, said power means being capable of exerting force on the second cable and through the first member on the first cable in the opposite direction.

6. In a bomb bay having a door extending longitudinally thereof and means hinging said door on the bay, a member rotatably mounted at each end of the bomb bay, means connecting each of said members to the door whereby rotation of the members moves the door, two cables each wound on each of said members and extending along the opposite sides of the bomb bay, a stretchable resilient member on one side of the bomb bay connected to the cable on the same side, a power device on the other side of the bay connected to the cable on such other side, said cables being so wound on said drums that resumption by said resilient member of its normal condition exerts a force on the cable on the same side in a direction to turn one of the members in a direction to open the door and through such member exerts a force on the other cable to turn the other member in a direction to open the door, said power means being capable of exerting force on the second cable and through the first member on the first cable in the opposite direction in which the second cable includes a piston rod having a piston thereon, and said power means includes a cylinder in which said piston is slidable and means to supply pressure fluid to said cylinder.

7. In a bomb bay having a door extending longitudinally thereof and means hinging said door on the bay, a member rotatably mounted at each end of the bomb bay, means connecting each of said members to the door whereby rotation of the members moves the door, two cables each wound on each of said members, pulleys for guiding said cables to extend along the opposite sides of the bomb bay, a stretchable resilient member on one side of the bomb bay connected to the cable on the same side, a power device on the other side of the bay connected to the cable on such other side, said cables being so wound on said drums that resumption by said resilient member of its normal condition exerts a force on the cable on the same side in a direction to turn one of the members in a direction to open the door and through such member exerts a force on the other cable to turn the other member in a direction to open the door, said power means being capable of exerting a force on the second cable and through the first member on the first cable in the opposite direction.

8. In a bomb bay having a door extending longitudinally thereof and means hinging said door on the bay, a member rotatably mounted at each end of the bomb bay, means connecting each of said members to the door whereby rotation of the members moves the door, two cables each wound on each of said members, pulleys for guiding said cables to extend along the opposite sides of the bomb bay, a stretchable resilient member on one side of the bomb bay connected to the cable on the same side, a power device on the other side of the bay connected to the cable on such other side, said cables being so wound on said drums that resumption by said resilient member of its normal condition exerts a force on the cable on the same side in a direction to turn one of the members in a direction to open the door and through such member exerts a force on the other cable to turn the other member in a direction to open the door, said power means being capable of exerting a force on the second cable and through the first member on the first cable in the opposite direction in which the second cable includes a piston rod having a piston thereon, and said power means includes a cylinder in which said piston is slidable and means to supply pressure fluid to said cylinder.

JOHN W. EDGEMOND.